Oct. 2, 1956　　　J. F. MARION　　　2,765,460
AUTOMATIC FREQUENCY CONTROL FOR RADAR TEST APPARATUS
Filed July 30, 1952　　　2 Sheets-Sheet 1
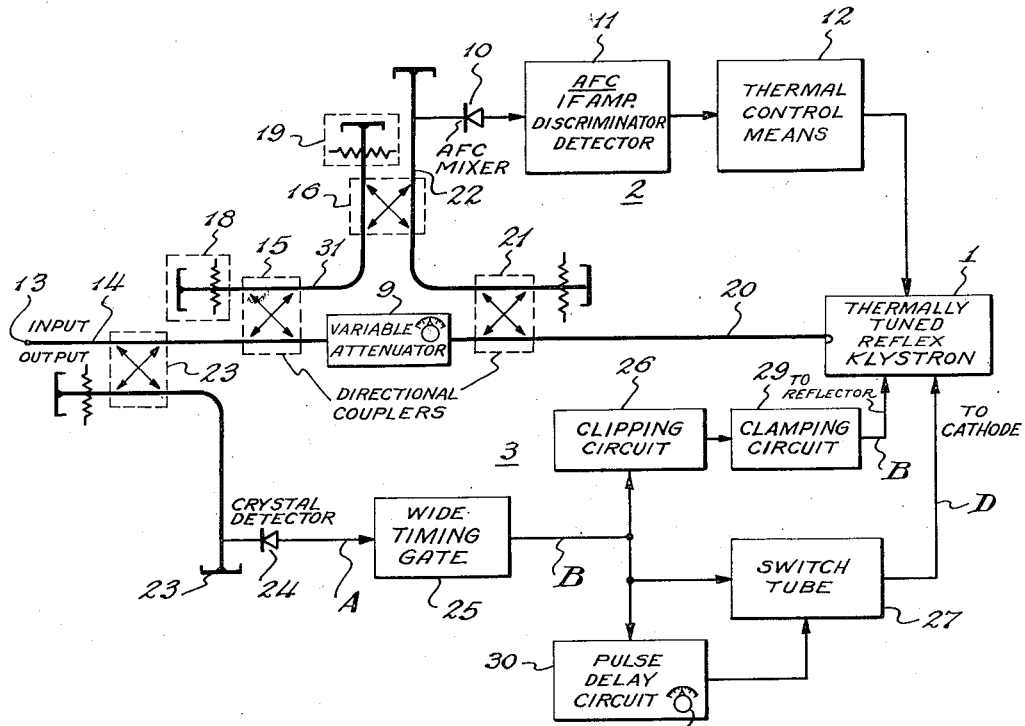
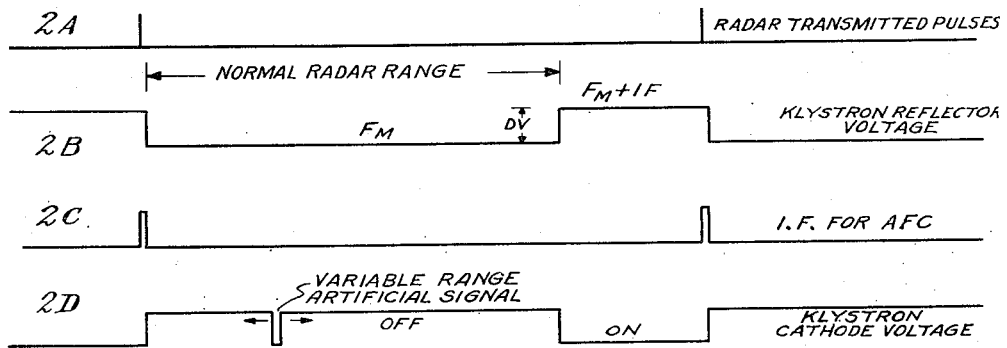
INVENTOR
JOHN F. MARION
BY
James C. Malone
ATTORNEY Oct. 2, 1956    J. F. MARION    2,765,460
AUTOMATIC FREQUENCY CONTROL FOR RADAR TEST APPARATUS
Filed July 30, 1952    2 Sheets-Sheet 2
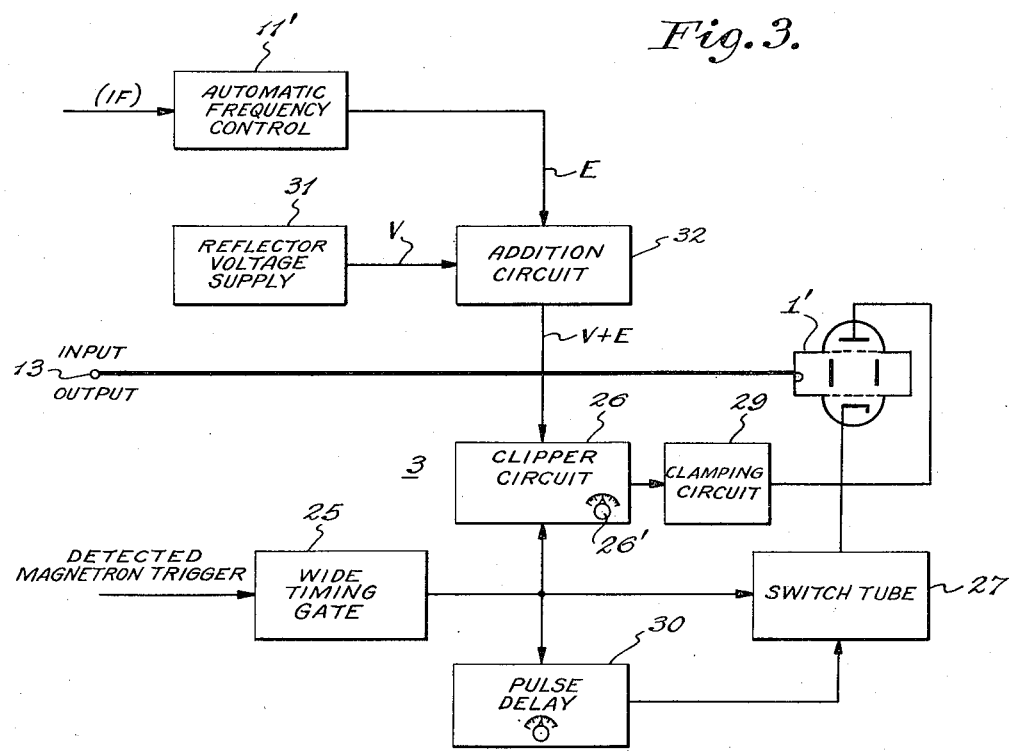
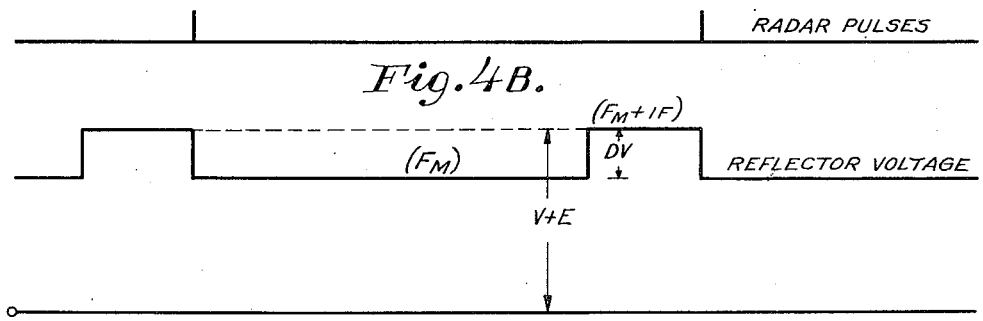
INVENTOR
JOHN F. MARION
BY
James P. Malone
ATTORNEY United States Patent Office 2,765,460
Patented Oct. 2, 1956

2,765,460

AUTOMATIC FREQUENCY CONTROL FOR RADAR TEST APPARATUS

John F. Marion, Levittown, N. Y., assignor to Sperry Rand Corporation, a corporation of Delaware Application July 30, 1952, Serial No. 301,710

11 Claims. (Cl. 343—17.7)

This invention relates to testing or evaluator apparatus for radar systems and more particularly to automatic frequency control for said testing apparatus.

In order to properly evaluate the performance of a radar system, it is desirable to have an artificial target generator of suitable power level. The artificial signal generator may be used as a performance standard, and for the purpose of properly tuning and aligning the radar receiving system. Prior art evaluators, for instance echo boxes, do not simulate individual targets of realistically proportional amplitude level but merely provide simulated target signals displaced by a certain ringing time.

Because of the relatively poor frequency stability of a conventional radar magnetron oscillator the radar receiver is usually synchronized with the magnetron frequency by suitable automatic frequency control circuits. Test signal generator apparatus for supplying a simulated target signal to a radar system should be similarly synchronized with the magnetron frequency for the same reason.

One of the simplest possible ways of producing a simulated echo pulse comprised of oscillations at the magnetron radio frequency would be to tune an oscillator, for instance a reflex klystron, manually until the target became visible on the radar indicator. The effectiveness of this system would depend upon the drifts of both the magnetron and the test oscillator frequencies as a function of time, as well as the adroitness of the operator who tuned the oscillator. If the rate were sufficiently low, so that the two frequencies would not depart greatly during a test run, the method might conceivably be of practical use. Since it is most difficult to predict in advance the amount of drift for any given set of conditions, the preset method must yield to the inherent practical advantages of an automatic and continuous method of control.

In accordance with the present invention provision is made for an intermediate frequency (IF) control voltage input to an automatic frequency control discriminator in the test signal generator. The simulated radar test signal may be delayed for a selectable and adjustable time interval with respect to a known reference and thereby assume a time indicium representative of a range distance embraced within the ordinary receiving range of the radar system. Automatic frequency control of the test signal generator is effected during that portion of the cyclic radar period when radar signals are not ordinarily received because that portion of the radar period represents range distances beyond the design limitations of the system. This is accomplished by applying a frequency control signal to operate the tester oscillator at magnetron frequency ($F_M$) during the normal receiving portion of the radar cyclic period and automatically adjusting the frequency control signal to operate the oscillator at ($F_M+IF$) frequency during the remainder of the cycle.

Accordingly, the primary object of the invention is to provide new and improved radar target signal simulating means.

Another object of the present invention is to provide new and improved dynamic radar testing means.

Another object of the present invention is to provide new and improved automatic frequency control for a radar target simulator.

Another object of the present invention is to provide new and improved automatic frequency control means.

Another object of the present invention is to provide new and improved klystron automatic frequency control means.

These and other objects of the invention will be apparent from the following specification and figures of which:

Fig. 1 is a block diagram of an embodiment of the invention;

Figs. 2A to 2D are waveforms illustrative of the relationship of signals developed in apparatus in accordance with the invention;

Fig. 3 is a block diagram of another embodiment of the invention.

Figs. 4A and 4B are waveforms illustrative of the operation of the embodiment of Fig. 3.

A signal simulating system in accordance with the present invention basically comprises an oscillator to provide signals at magnetron frequency, automatic frequency control to dynamically synchronize the oscillator with the radar transmitter magnetron frequency, a pulse generator adapted to gate the oscillator after selectable time intervals, and a wide gate generator responsive to the transmitted radar pulse to suppress the automatic frequency control of the oscillator during that portion of the cyclic radar period corresponding to the normal range limitations of the radar system. The automatic frequency control circuits are preferably energized by a suitable intermediate frequency, for instance 20 megacycles, which may be derived from the magnetron. Preferably the intermediate frequency should be high relative to the major portion of the video spectrum of the detected magnetron pulse in order to avoid excessive noise. The radar test set is synchronized by the transmitted radar magnetron pulses and is adapted to provide signals of magnetron frequency during that portion of the radar pulse repetition period when signals are normally received. The automatic frequency control signal for the test set is derived only during the remaining portion of the radar repetition period. The simulated target signals may be provided at any desired time delay interval corresponding to a proportionate range by controlling pulse modulation of the signal generator through a variable pulse delay circuit.

Fig. 1 shows an embodiment of the dynamic tester of the present invention. Fig. 1 comprises generally a thermally tuned reflex klystron 1 as the tester oscillator, automatic frequency control circuits 2 for the klystron, and delay and gating circuits 3 which produce a series of timing and gating pulses. The timing and gating waveforms are shown in Fig. 2, as follows:

Fig. 2A shows typical transmitted radar pulses vs. a linear time base.

Fig. 2B shows the waveform applied to the klystron reflector to cause the klystron to operate at magnetron frequency $F_M$ during one portion of the cycle, and at ($F_M+IF$) frequency during the remaining portion.

Fig. 2C shows the intermediate frequency (IF) pulses obtained by mixing the magnetron frequency, Fig. 2A, with the klystron frequency ($F_M+IF$), Fig. 2B. The intermediate frequency pulses of Fig. 2C, used in the automatic frequency control discriminator, occur only during coincidence of the waveforms of Figs. 2A and 2B, the showing being exaggerated to emphasize the relationships of the several waveforms.

Fig. 2D shows the beam control voltage applied to the klystron cathode. This voltage gates the klystron "off" during the normal radar receiving range, except for the variable range artificial signal, and turns the klystron "on" for the remaining portion of the cycle.

The principle of operation is based upon the fact that the simulated echo pulse and the radar magnetron pulse occur at different times in the operation cycle of the radar. When adjusted for correct operation, the control circuit will pulse the klystron at frequency $F_M$ (the magnetron frequency) during the normal "listening" time of the radar, and will also permit the tube to oscillate at magnetron frequency plus the automatic frequency control intermediate frequency ($F_M+IF$), during the dead time of the radar (time when echoes beyond the effective range of the radar would be received), until just after the next magnetron pulse initiates the succeeding cycle of operation.

This operating cycle is accomplished by accomplishing synchronized control of two methods of adjusting the frequency of the thermally tuned reflex klystron; namely, the reflector tuning characteristic, and the resonator tuning characteristic responsive to the thermal elements in the tube.

The automatic frequency control circuits 2 may be conventional and are preferably of the sweep and lock type designed to lock on one side of the radar frequency only. They may comprise a mixer 10, automatic frequency control circuits 11 (including an intermediate frequency amplifier, a detector, and a discriminator) and thermally controlled tuning means 12 for the klystron. A typical thermally controlled klystron is shown in Patent No. 2,575,334, issued to C. Dodd.

The radar magnetron frequency is received through input-output terminal 13 and fed through transmission line 14 which may be a wave guide, to directional couplers 15 and 16, and applied to the automatic frequency control mixer 10. The signal output of klystron oscillator 1 is also applied through wave guide 20, directional coupler 21, and wave guide 22 to the mixer 10. The wave guides have suitable matched terminations as represented schematically at 18 and 19. The output of the mixer 10 is supplied to the automatic frequency control circuits 2, as previously described, which operate in a conventional manner. Directional couplers 23, 15, and 16 have suitable attenuation to protect the crystals 24 and 10 from breakdown and damage which might otherwise result from the magnetron high power output. Variable attenuator 9 similarly protects the klystron and avoids pulling its frequency, and also provides proper signal level output. The variable attenuator circuit 9 preferably includes a T-R tube to protect the klystron.

The directional couplers 15 and 21, may be conventional, for instance of the two-hole type. The arrows on the directional couplers signify that energy will flow along the arrows. Input energy arriving at terminal 13 will follow wave guide 14 and be coupled by directional coupler 15 to wave guide 31, as indicated by the arrow but not in the direction of termination 18.

The transmission lines, which may be wave guides or coaxial lines, have suitably matched terminations such as that indicated schematically at 18. Terminations which do not have a matched impedance shown of which termination 23 is one, must be properly terminated at that point. In the embodiment illustrated by Fig. 1, the wave guide at 23 is terminated by choosing the crystal detector 24 to have the proper impedance. This is conventional engineering practice and equivalent transmission line and matching arrangements may be made without departing from the novel concept of the invention.

The timing and gating circuits 3 are synchronized by the magnetron pulse received through terminal 13 and directional coupler 23 to crystal detector 24. The magnetron trigger as shown in Fig. 2A is supplied to the wide gate timing circuit 25 which may be a rectangular wave generator such as a multi-vibrator.

The output waveform of Fig. 2B is derived from gate circuit 25 applied to a clipping circuit 26 which regulates the amplitude of the pedestal DV, and thence to a clamping tube or D. C. restorer 29 which in turn stabilizes the voltage waveform relative to some known or determinable reference voltage. The output of the wide timing gate generator 25 is also applied to the pulse delay circuit 30 to produce a pulse signal which may be variably delayed relative to the start of the cycle by adjustment of knob 30′. Therefore, the simulated radar range may be set or adjusted by means of the knob 30′. The circuit 30 may comprise a variable delay multi-vibrator and a pulse generator.

The wide timing gate produced by generator 25 is also applied to a switch tube 27 which applies a voltage to the cathode of the klystron 1 and turns the klystron on and off at the proper times in the cycle as illustrated by waveform 2D plotted against the common time scale of Fig. 2. The pulse delay circuit 30 energizes the switch tube to turn the klystron on to provide the simulated target signal, as indicated in Fig. 2D. When the klystron 1 is pulsed, it provides a pulse of magnetron frequency energy which is coupled through wave guide 20 and variable attenuator 9 to the output terminal 13. The terminal 13 is preferably connected to the radar system at a point just before the radar antenna so that the simulated target signal appears to be a radar signal just as if it were received from the antenna.

A typical klystron adapted for use in this system is a 2K45 which is a thermally tuned reflex klystron operating at 3 cm. wavelength. It is commercially available and described on pages 503 and 514 of the book, "Klystrons and Microwave Triodes," volume 7 of the MIT Series, published by McGraw Hill. In the present system, the klystron has two operating frequencies, $F_M$ and $F_M+I. F.$, where $F_M$ is the radar magnetron frequency and I. F. is an intermediate frequency, which may be for instance 20 megacycles. The klystron tube should have a linear reflector voltage vs. frequency tuning characteristic since the present method of "frequency shift," automatic frequency control depends for its accuracy of control upon the linearity of this characteristic. Of course, other type tubes having comparable characteristics may be used.

The choice of the intermediate frequency must be the result of a compromise. From the point of view of the frequency-shift operation, it is desirable to have the intermediate frequency as small as possible because a smaller I. F. results in less frequency shift and since the reflector tuning characteristic of most reflex klystrons may not be perfectly linear, the average slope of the characteristic may change as the frequency is varied over the radar band for various modes of operation. Contrasted to this is the requirement that the intermediate frequency be high enough to exclude the major portion of the video spectrum of the detected magnetron pulse. One embodiment of the system using 0.25 microsecond pulses was designed to operate with an intermediate frequency of 10 megacycles, but was found to be excessively noisy due to the latter-mentioned effect. Subsequently, a system was designed using an intermediate frequency of 20 megacycles and was found to operate satisfactorily.

Fig. 3 schematically illustrates an embodiment of the invention in which the klystron 1′ is not of the thermally tuned type. The major difference between this embodiment and that of Fig. 2 is that the automatic frequency control voltage E is added to the normal reflector supply voltage V, as shown in Fig. 4.

Fig. 4A shows the transmitted radar pulses, and Fig. 4B shows the reflector voltage waveform which is similar to that of Fig. 2B. The timing gate generator 25, range pulse delay circuit 30, reflector clipper circuit 26, clamper circuits 29, and the cathode switch circuit 27 are analogous to corresponding components shown in Fig. 1. The voltage V is a reference level voltage supplied by voltage supply 31, and is modified by the automatic frequency control voltage E. These two voltages are added in circuit 32 to provide voltage V+E to which the wide gate is clamped as in Fig. 4B. This combined voltage is also supplied to the reflector of the klystron in the same manner as has been previously described in connection with Fig. 2. The step DV of waveform, Fig. 4B, is controlled by a conventional clipper circuit adjustable by knob 26'. The frequency shift (I. F.) of the klystron is determined by the difference DV between the two levels of the waveform of Fig. 4B exactly as described in connection with Fig. 2. The simulated target signal from range delay circuit 30 is the same as in Fig. 2. The control voltage I. F. is derived during the coincidence of waveforms, Figs. 4A and 4B, as in the prior embodiment of Fig. 2C.

If desired, the proper klystron pulsing could be accomplished by pulsing the reflector voltage from a reference voltage, outside of the oscillatory mode being used, to voltage V+E−DV to obtain a pulse at frequency $F_M$ or to voltage V+E to obtain frequency $F_M$+I. F. so that all control is applied to the reflector.

Apparatus suitable for automatic frequency control circuit 11 is shown in volume 1 of the Radiation Laboratory Series—McGraw Hill, beginning at page 472.

Apparatus suitable for the thermal control means 12 is shown in volume 16 of the Radiation Laboratory Series, page 334.

Suitable apparatus for clamping circuit 29 and clipping circuit 26 is shown in volume 1 of the Radiation Laboratory Series, beginning on page 503.

Suitable apparatus for the pulse delay circuit 30 is shown in Meacham Patents 2,422,204 and 2,422,205 for accurate ranging circuits.

The automatic frequency control system has been described in connection with a radar system, but it is not so limited. It may be used with any pulse type radio frequency system, for instance a beacon type system or a pulse communication system.

The operation of the invention may be described as follows.

The transmitted signal is received at terminal 13, Fig. 1, and fed through directional couplers 15 and 16 to mixer 10 where it is mixed with the signal from klystron oscillator 1, producing an intermediate frequency signal, which is amplified and detected in A. F. C. circuit 11 and then fed to thermal control means 12 to control the frequency of the klystron oscillator 1.

The transmitted signal is also fed through directional coupler 23 to the time-sharing control circuits. It is detected at detector 24 and triggers the timing gate generator 25 to produce the wide gate, Fig. 2B, which is regulated in amplitude by the clipping circuit 26, clamped to a reference voltage by clamping circuit 29, and then fed to the klystron reflector. The wide timing gate operates the klystron at frequency $F_M$ during one portion of the cycle and at ($F_M$+I. F.) during the second portion. An inverted version of the wide timing gate is applied through the switch tube 27 to the cathode of the oscillator to switch the klystron oscillator on and off. The wide timing gate also triggers an adjustable pulse delay circuit 30 which may be used to produce a simulated signal pulse on the cathode of the klystron, as shown in Fig. 2D. The simulated signal at the klystron frequency is fed from the output terminal 13 to the system under test. The apparent range as represented by the delay imposed upon the simulated signal may be varied by appropriate adjustment of the delay knob 30' of pulse delay circuit 30.

The embodiment of Fig. 3 operates in the same manner, except that the frequency control and the timing control voltages are both applied to the reflector of the oscillator. This system may be used with an oscillator which is not thermally tuned.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system for simulating pulse radar received signals of selectable range comprising an oscillator adjustable in frequency, automatic frequency control means responsive to a difference frequency between said radar signals and said oscillator to control the frequency of said oscillator in response to changes in frequency of the radar signals, a source of control signal connected to shift the frequency by an amount equal to said difference frequency, and timing means responsive to said radar pulse signal for controlling said signal source to cause said oscillator to operate at radar frequency during one portion of said radar pulse cycle and at radar frequency plus said difference frequency during the second portion of said cycle.

2. Apparatus as in claim 1, wherein said timing means includes means to pulse modulate said oscillator at a variable time during said first portion of said cycle to thereby simulate reflected signals from a radar target.

3. An automatic frequency control system for a signal simulator for use with a regular repetition rate pulse type radar system comprising a klystron oscillator having thermal frequency control means, means to receive and mix said radar signal and said oscillator signal to obtain an intermediate frequency, a frequency discriminator responsive to said intermediate frequency and connected to control the frequency of said klystron oscillator, means to apply to said klystron reflector a voltage adapted to cause said klystron to oscillate at said radar signal frequency during a first portion of said radar pulse cycle, means to cut off said klystron with a blanking voltage applied to the cathode of said klystron during said first portion of said cycle, and means to apply a variable pulse to said cathode to gate said klystron on to thereby provide a simulated signal at said radar frequency.

4. An automatic frequency control system for a pulse radar signal simulator comprising an oscillator having dual frequency control means, means to receive and mix a radar signal and said oscillator signal to obtain an intermediate frequency, a frequency discriminator responsive to said intermediate frequency and connected to control the frequency of said klystron oscillator, means to apply to said klystron reflector a voltage adjusted to cause said klystron to oscillate at said radar signal frequency during the normal receiving portion of said pulse radar cycle, means to cut off said klystron by a blanking voltage applied to the cathode of said klystron during said receiving portion of said cycle, and means to apply a variable pulse to said cathode to gate said klystron on to thereby provide a simulated signal at radar frequency.

5. An automatic frequency control system for a pulse radar signal simulator comprising a klystron oscillator having two separate frequency control means, means to receive and mix said radar signal and said oscillator signal to obtain an intermediate frequency, a frequency discriminator responsive to said intermediate frequency and connected to one of said frequency control means to control the frequency of said klystron oscillator, means to apply to said second klystron control means a control voltage adjusted to cause said klystron to oscillate at said radar signal frequency when gated during a first portion of said radar timing cycle, means to gate off said klystron by a blanking voltage applied to the cathode of said klystron during said first portion of said timing cycle, means to apply a variable time pulse to said cathode to gate said klystron on to thereby provide a simulated signal at radar frequency, and means to apply a second voltage to said klystron reflector to cause said klystron to oscillate at a frequency different from said radar frequency by said intermediate frequency during the remaining portion of said radar pulse cycle.

6. An automatic frequency control system for a radar signal simulator comprising an oscillator having dual frequency control means, means to receive and mix a radar signal and said oscillator signal to obtain an intermediate frequency, a frequency discriminator responsive to said intermediate frequency and connected to control the frequency of said oscillator, means to cause said oscillator to operate at said radar signal frequency when gated during a first portion of the cycle, timing means to cut off said klystron by a blanking voltage applied to the cathode of said klystron during said first portion of the cycle, means to apply a variable pulse to said cathode to gate said klystron on and thereby provide a simulated signal at radar frequency, and means to apply a voltage to said klystron reflector to cause said klystron to oscillate at a frequency different from said radar frequency by a predetermined amount during a second portion of the radar cycle, to provide an automatic frequency control voltage.

7. An automatic frequency control system for pulse signal simulator comprising a klystron oscillator having thermal and reflector frequency control means, means to receive and mix a radar signal and said oscillator signal to obtain an intermediate frequency, a frequency discriminator responsive to said intermediate frequency and connected to thermally control the frequency of said klystron oscillator, means to apply to said klystron reflector a voltage adjusted to cause said klystron to oscillate at said radar signal frequency during a first portion of said pulse signal cycle, means to cut off said klystron by a blanking voltage applied to the cathode of said klystron during said first portion of the cycle, and means to apply a variable pulse to said cathode to gate said klystron on to thereby provide a simulated signal at radar frequency.

8. A system for simulating a received pulse radar signal of selectable range in relation to a transmitted radar pulse, comprising a variable frequency oscillator, automatic frequency control means connected to receive said transmitted pulse and said oscillator output to stabilize said oscillator with respect to the frequency of said transmitted pulse, second control means to vary said oscillator frequency by a fixed determinable amount, means to selectably delay said transmitted pulse, means responsive to said transmitted pulse to cut-off said oscillator for a period of time correlated to the normal range limit of said radar, means responsive to said delayed transmitted pulse to switch on said oscillator for the duration of said delayed pulse, and means responsive to the end of said cut-off period to operatively connect said second control means to said oscillator until the next succeeding transmitted radar pulse.

9. Apparatus for generating a simulated echo pulse in response to a received radar pulse, comprising an oscillator adjustable in frequency about the carrier frequency of the received radar pulses, means for shifting the frequency of the oscillator by a predetermined fixed amount, said means including timing gate means triggered by the received radar pulses for shifting the frequency of the oscillator by said fixed amount following a received radar pulse and returning the oscillator to its initial frequency before receiving the next radar pulse, and automatic frequency control means responsive to the received radar pulses for controlling the frequency of the oscillator at a frequency differing from the carrier frequency of the received radar pulses by said fixed amount of frequency shift.

10. Apparatus as defined in claim 9 wherein said timing gate means includes means for gating said oscillator on and off simultaneously with the shift in frequency, the oscillator being gated off following a received radar pulse and gated on before reception of the next radar pulse.

11. Apparatus as defined in claim 10 further including means for momentarily gating said oscillator on at a selectively variable time interval following a received radar pulse.

References Cited in the file of this patent

UNITED STATES PATENTS

| | | |
|---|---|---|
| 2,475,074 | Bradley et al. | July 5, 1949 |
| 2,549,131 | Rideout | Apr. 17, 1951 |
| 2,573,734 | Saunders | Nov. 6, 1951 |
| 2,594,263 | Munster | Apr. 22, 1952 |